(12) United States Patent
Romem et al.

(10) Patent No.: US 10,740,202 B2
(45) Date of Patent: Aug. 11, 2020

(54) SYSTEM AND METHOD FOR EFFICIENT COMPARISON OF MIRRORED STORAGE DEVICES

(71) Applicant: Excelero Storage Ltd., Tel Aviv (IL)

(72) Inventors: Yaniv Romem, Jerusalem (IL); Omri Mann, Jerusalem (IL); Ofer Oshri, Kfar Saba (IL); Kirill Shoikhet, Raanana (IL); Daniel Herman Shmulyan, Beer Yaaqov (IL)

(73) Assignee: EXCELERO STORAGE LTD., Tel Aviv (IL)

( * ) Notice: Subject to any disclaimer, the term of this patent is extended or adjusted under 35 U.S.C. 154(b) by 9 days.

(21) Appl. No.: 16/270,017

(22) Filed: Feb. 7, 2019

(65) Prior Publication Data

US 2019/0243733 A1 Aug. 8, 2019

Related U.S. Application Data

(60) Provisional application No. 62/627,223, filed on Feb. 7, 2018.

(51) Int. Cl.
*G06F 11/20* (2006.01)

(52) U.S. Cl.
CPC ...... *G06F 11/2064* (2013.01); *G06F 11/2069* (2013.01); *G06F 11/2082* (2013.01); *G06F 2201/82* (2013.01)

(58) Field of Classification Search
CPC ... G06F 2201/82; G06F 11/2053–2064; G06F 11/14; G06F 11/1443; G06F 11/1446; G06F 11/16; G06F 11/1612; G06F 11/1629; G06F 11/1662; G06F 11/1666; G06F 11/167; G06F 11/1451
See application file for complete search history.

(56) References Cited

U.S. PATENT DOCUMENTS

| | | | |
|---|---|---|---|
| 6,910,178 B1 | 6/2005 | Kiselev et al. | |
| 7,290,101 B1 * | 10/2007 | Kekre | G06F 11/2071 709/216 |
| 7,340,640 B1 * | 3/2008 | Karr | G06F 3/0613 711/209 |

(Continued)

OTHER PUBLICATIONS

Z. Zhao, T. Qin, F. Xu, R. Cao, X. Liu and G. Wang, "CAWRM: A remote mirroring system based on AoDI volume," 2011 IEEE/IFIP 41st International Conference on Dependable Systems and Networks Workshops (DSN-W), Hong Kong, 2011, pp. 99-104. (Year: 2011).*

*Primary Examiner* — Khoa D Doan
(74) *Attorney, Agent, or Firm* — M&B IP Analysts, LLC

(57) ABSTRACT

A system and method for comparing mirrored storage devices. The method includes: selecting, from a storage slice of a first storage device and at least a second storage device, corresponding storage blocks that are not trimmed blocks, wherein trimmed blocks are blocks within a storage device marked for erasure; comparing the corresponding storage blocks such that a non-trimmed block of the first storage device is compared to a corresponding non-trimmed block of the second storage device to determine which storage blocks do not match; and performing a recovery operation between the non-trimmed block of the first storage device and a non-matching corresponding first non-trimmed block of the second storage device.

19 Claims, 4 Drawing Sheets

(56) References Cited

U.S. PATENT DOCUMENTS

| | | | | |
|---|---|---|---|---|
| 7,386,754 B2* | 6/2008 | Cronch | G11B 19/04 | 714/5.11 |
| 7,421,551 B2* | 9/2008 | Desai | G06F 11/1448 | 711/100 |
| 7,707,372 B1* | 4/2010 | Kumar | G06F 11/2082 | 711/162 |
| 7,802,134 B1* | 9/2010 | Sobel | G06F 11/1458 | 709/253 |
| 7,809,898 B1 | 10/2010 | Kiselev et al. | | |
| 8,135,676 B1* | 3/2012 | Poojary | G06F 11/1451 | 707/646 |
| 8,417,987 B1* | 4/2013 | Goel | G06F 11/1076 | 714/6.1 |
| 8,463,991 B2* | 6/2013 | Colgrove | G06F 3/0605 | 711/114 |
| 8,612,382 B1* | 12/2013 | Patel | G06F 11/0727 | 707/609 |
| 8,838,545 B2* | 9/2014 | Tevis | G06F 11/1456 | 707/679 |
| 8,850,114 B2 | 9/2014 | Rosenband et al. | | |
| 8,874,958 B2* | 10/2014 | Gilbert | G06F 11/1044 | 714/6.22 |
| 9,256,378 B2* | 2/2016 | Zheng | G06F 3/0641 | |
| 9,747,178 B2 | 8/2017 | Sridhara | | |
| 9,846,718 B1* | 12/2017 | Ruef | G06F 3/0641 | |
| 9,940,198 B2* | 4/2018 | Gao | G06F 11/108 | |
| 9,946,608 B1* | 4/2018 | Per | G06F 3/064 | |
| 10,133,503 B1* | 11/2018 | Colgrove | G06F 3/0689 | |
| 10,437,865 B1* | 10/2019 | Clements | G06F 9/4856 | |
| 10,614,049 B2* | 4/2020 | Agrawal | H04L 67/1097 | |
| 2004/0260736 A1* | 12/2004 | Kern | G06F 11/2058 | |
| 2005/0210218 A1* | 9/2005 | Hoogterp | G06F 3/0613 | 711/203 |
| 2010/0049930 A1* | 2/2010 | Pershin | G06F 11/1448 | 711/162 |
| 2010/0077013 A1* | 3/2010 | Clements | G06F 16/1748 | 707/822 |
| 2011/0119456 A1* | 5/2011 | Ipek | G06F 11/1008 | 711/162 |
| 2013/0055018 A1* | 2/2013 | Joshi | G06F 11/2058 | 714/19 |
| 2013/0185510 A1* | 7/2013 | Ash | G06F 12/0868 | 711/118 |
| 2013/0282653 A1* | 10/2013 | Tandra Sistla | G06F 9/45558 | 707/610 |
| 2014/0006853 A1* | 1/2014 | Dudgeon | G06F 11/1435 | 714/15 |
| 2014/0108352 A1* | 4/2014 | Ahrens | G06F 11/1456 | 707/645 |
| 2014/0250079 A1* | 9/2014 | Gardner | G06F 11/1453 | 707/646 |
| 2014/0317479 A1* | 10/2014 | Candelaria | G06F 11/1004 | 714/807 |
| 2016/0080495 A1* | 3/2016 | Bilas | H04L 67/1097 | |
| 2016/0147797 A1* | 5/2016 | Dolph | G06F 16/2365 | 707/692 |
| 2017/0031613 A1* | 2/2017 | Lee | G06F 3/0619 | |
| 2017/0192860 A1* | 7/2017 | Vijayan | G06F 3/0619 | |
| 2018/0260125 A1* | 9/2018 | Botes | G06F 16/275 | |
| 2018/0357019 A1* | 12/2018 | Karr | G06F 3/0685 | |
| 2019/0235973 A1* | 8/2019 | Brewer | G06F 11/1471 | |
| 2019/0243733 A1* | 8/2019 | Romem | G06F 11/2082 | |
| 2019/0251279 A1* | 8/2019 | Emberson | H04L 63/0227 | |

\* cited by examiner

SYSTEM AND METHOD FOR EFFICIENT COMPARISON OF MIRRORED STORAGE DEVICES

CROSS-REFERENCE TO RELATED APPLICATIONS

This application claims the benefit of U.S. Provisional Application No. 62/627,223 filed on Feb. 7, 2018, the contents of which are hereby incorporated by reference.

TECHNICAL FIELD

The present disclosure relates generally to redundant storage schemes, and particularly to the recovery of mirrored storage volumes.

BACKGROUND

Reliable data backup schemes are essential for individuals and corporations that create, transfer, access and share data. Redundant storage schemes are a commonly employed tool for data backup, and may include a process known as mirroring. This involves replicating a first logical storage volume to a second logical storage volume, either in real-time (synchronous) or intermittently (asynchronous). In a synchronous system, operations such as write operations are performed simultaneously to ensure that the two volumes are always consistent with each other. From the perspective of a client device accessing the storages, fetching data from the first storage or the second storage should produce an identical result.

Redundant Array of Independent Disks (RAID) technology is an example implementation of such redundancy. During a failure event, when one or more of the mirrored disks is down, a disk which is functioning provides client devices with access to the data stored thereon. When the failed disks recover, or otherwise a mirroring process is initiated, the entirety of one disk is copied to another. In other examples, the system may compare a block on a first volume with a block on a second volume to determine if they are mirrored. Each of these operations requires reading the block from the storage volumes, and utilizing a portion of available network bandwidth connecting the drives so that the block contents can be compared. This process may take a significant amount of time and bandwidth, both of which can be costly. Additionally, many system automatically access and compare section of a volume that are trimmed, or slated for erasure, devoting time and computing resources unnecessarily.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for comparing mirrored storage devices. The method includes: selecting, from a storage slice of a first storage device and at least a second storage device, corresponding storage blocks that are not trimmed blocks, wherein trimmed blocks are blocks within a storage device marked for erasure; comparing the corresponding storage blocks such that a non-trimmed block of the first storage device is compared to a corresponding non-trimmed block of the second storage device to determine which storage blocks do not match; and performing a recovery operation between the non-trimmed block of the first storage device and a non-matching corresponding first non-trimmed block of the second storage device.

Certain embodiments disclosed herein also include a non-transitory computer readable medium having stored thereon instructions for causing a processing circuitry to perform a process, the process including: selecting, from a storage slice of a first storage device and at least a second storage device, corresponding storage blocks that are not trimmed blocks, wherein trimmed blocks are blocks within a storage device marked for erasure; comparing the corresponding storage blocks such that a non-trimmed block of the first storage device is compared to a corresponding non-trimmed block of the second storage device to determine which storage blocks do not match; and performing a recovery operation between the non-trimmed block of the first storage device and a non-matching corresponding first non-trimmed block of the second storage device.

Certain embodiments disclosed herein also include a system for comparing mirrored storage devices, including: a processing circuitry; and a memory, the memory containing instructions that, when executed by the processing circuitry, configure the system to: select, from a storage slice of a first storage device and at least a second storage device, corresponding storage blocks that are not trimmed blocks, wherein trimmed blocks are blocks within a storage device marked for erasure; compare the corresponding storage blocks such that a non-trimmed block of the first storage device is compared to a corresponding non-trimmed block of the second storage device to determine which storage blocks do not match; and perform a recovery operation between the non-trimmed block of the first storage device and a non-matching corresponding first non-trimmed block of the second storage device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
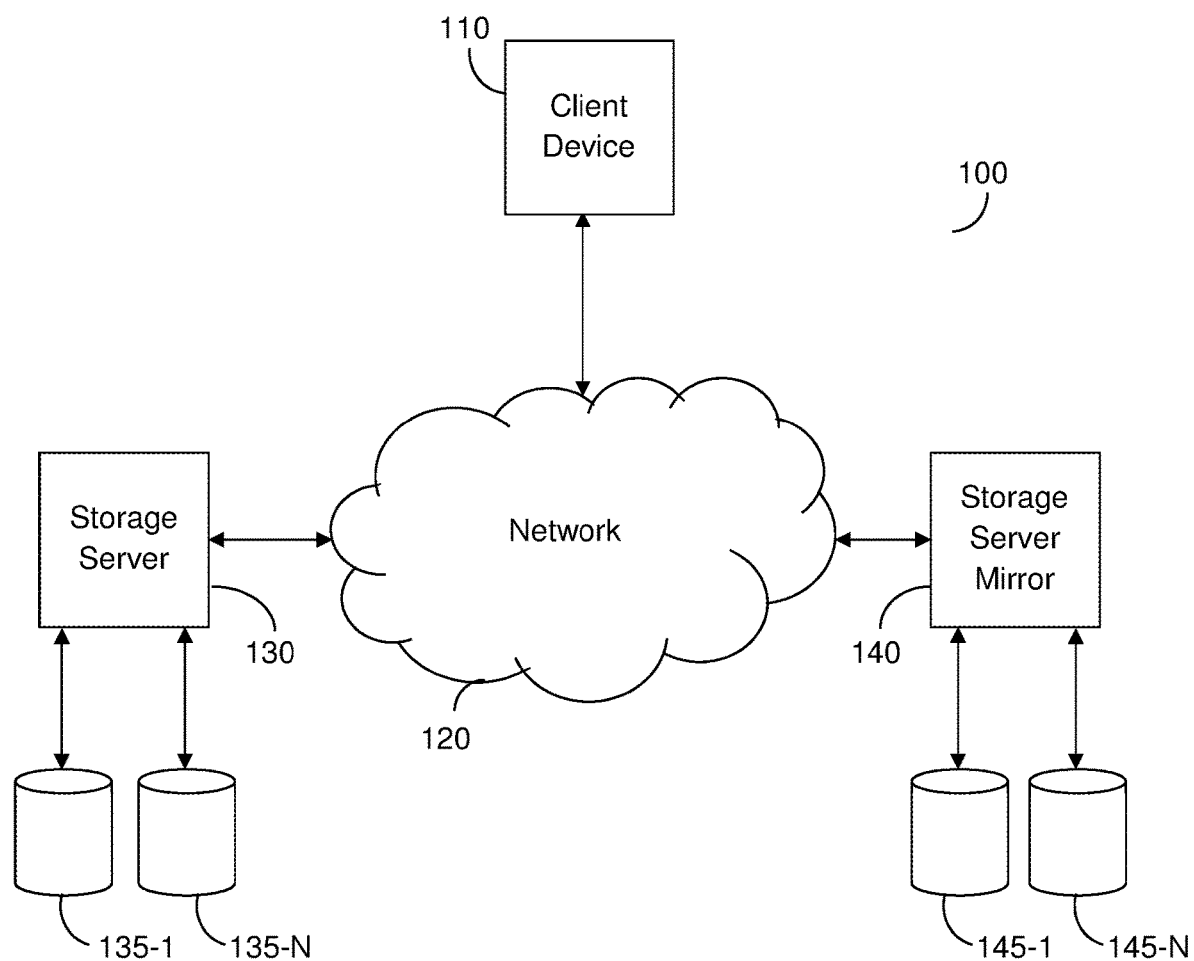
FIG. 1 is a network diagram utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The example embodiments include systems with data protection, such as mirrored storages, occasionally experience failures with one or more of the storage devices. Typically, when this occurs storage blocks in the same slice located in different storage volumes are compared to ascertain if they have the correct content. This may require intensive use of processing and network resources. Therefore, it is suggested to select a slice of storage blocks, including a first storage block from a first storage device and a corresponding storage block from a second storage device and generate a comparison between the first storage block and a content generated by reading a redundancy storage block of the slice, only in response to determining that a number of other blocks in the slice are not trimmed blocks. Trimmed blocks are blocks that have been tagged as containing data that is no longer in use and can be erased, and therefore should not be compared as they should have no effect on the stored content. Thus, comparing trimmed blocks is a waste of time and resources.

FIG. 1 is an example network diagram 100 utilized to describe the various embodiments. A client device 110 is connected to a network 120. In an embodiment, the network 120 may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity. The client device 110 may be a computer, such as a laptop, desktop, IoT device, and the like.

The network 120 further provides connectivity to a plurality of storage devices arranged in a redundant storage scheme. For example, a first storage server 130 may include a plurality of first storage devices 135-1 through 135-N, where N is an integer equal to or greater than 1, and a second storage server 140 is configured to mirror the first storage server. The second storage server 140 includes a plurality of mirror storage devices 145-1 through 145-N such that each storage device, e.g., 135-1, corresponds to a mirrored storage device e.g., 145-1.

In redundant storage schemes, such as RAID technologies, storage mirroring is the replication of a logical disk into separate physical hard disks. Mirroring is performed in real time to ensure that if a storage device 135 fails, a redundant mirrored device 145 may be used to ensure data availability.

However, when the first storage 135 recovers from failure, it is not always immediately evident which blocks to mirror from which storage. For example, if a first block from the first storage should mirror a second block from the second storage, and there is no match, ascertaining which block should mirror which is not always a straightforward task. Another problem arises with trimmed blocks. Trimmed blocks, or blocks that are marked for erasure, are also compared in this situation of recovery. Comparing trimmed blocks between two storages wastes resources and prolongs the recovery period, making it inefficient and ultimately failing to improve the availability of data.

Figure 2:
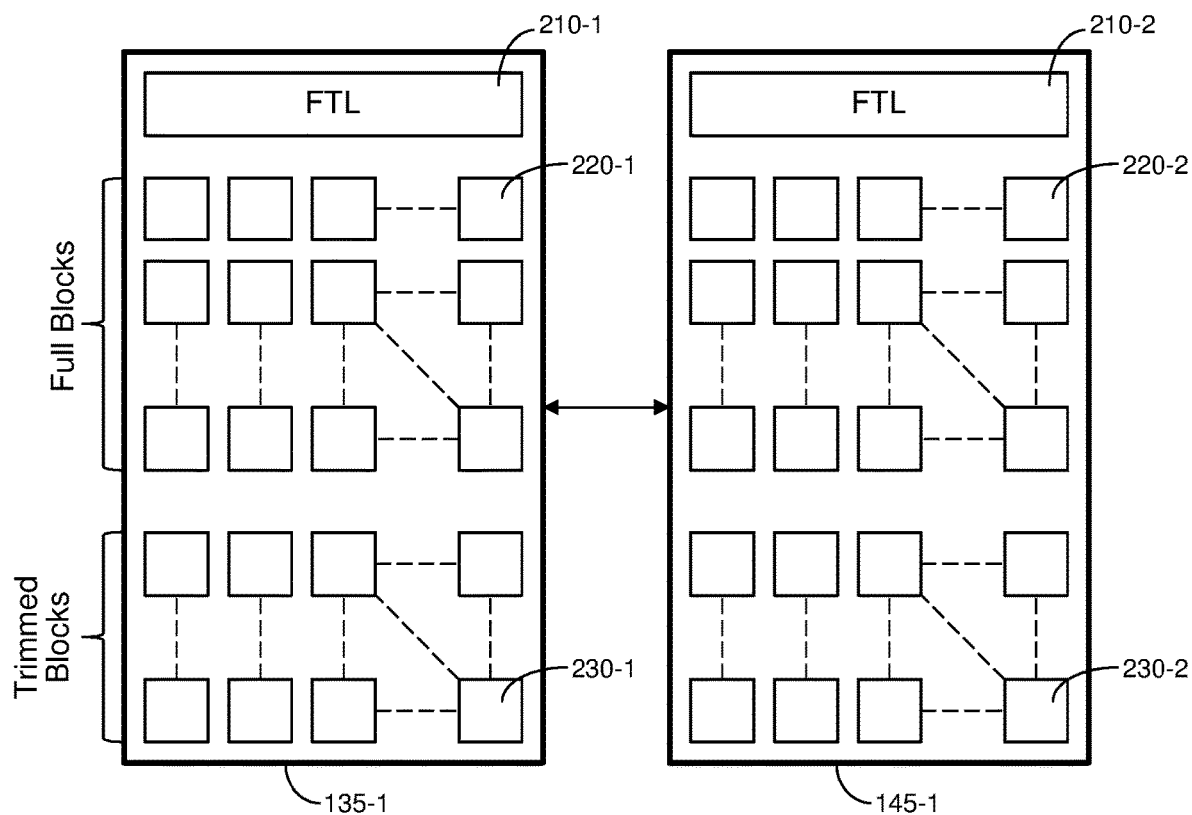
FIG. 2 is a schematic illustration of a first storage and a second mirrored storage, implemented in accordance with an embodiment.

FIG. 2 is an example schematic illustration of a first storage 135-1 and a second mirror storage 145-2, implemented in accordance with an embodiment. A flash drive, such as storage 135-1, includes a flash translation layer (FTL) 210-1, a first plurality of blocks (such as physical block 220-1), and a second plurality of trimmed blocks (such as block 230-1). The FTL 210-1 translates requests to the storage 135-1 between a block address to a physical block address of the storage 135-1. Typically, the physical addresses of a storage are not exposed outside of the storage device itself. For example, the FTL 210-1 (or FTL 210-2 of mirror storage 145-1) may store a table associating each of a plurality of block addresses with physical blocks of the storage, such as physical block 220-1. A logical address associated with physical block 220-1 of storage 135-1 is mirrored to a logical address associated with physical block 220-2 of storage 145-1. In response to initiating recovery, the contents of physical block 220-1 are compared with the contents of physical block 220-2. A logical address associated with physical block 230-1 is mirrored with a logical address associated with physical block 230-2 of storage 145-1. Physical blocks 230-1 and 230-2 are trimmed blocks of their respective storages. Therefore, comparing these blocks would not yield a meaningful result. By determining that a block is trimmed, a recovery process may skip comparison of any trimmed blocks, resulting in a speedier and more efficient comparison and recovery process and less use of network bandwidth.

Figure 3:
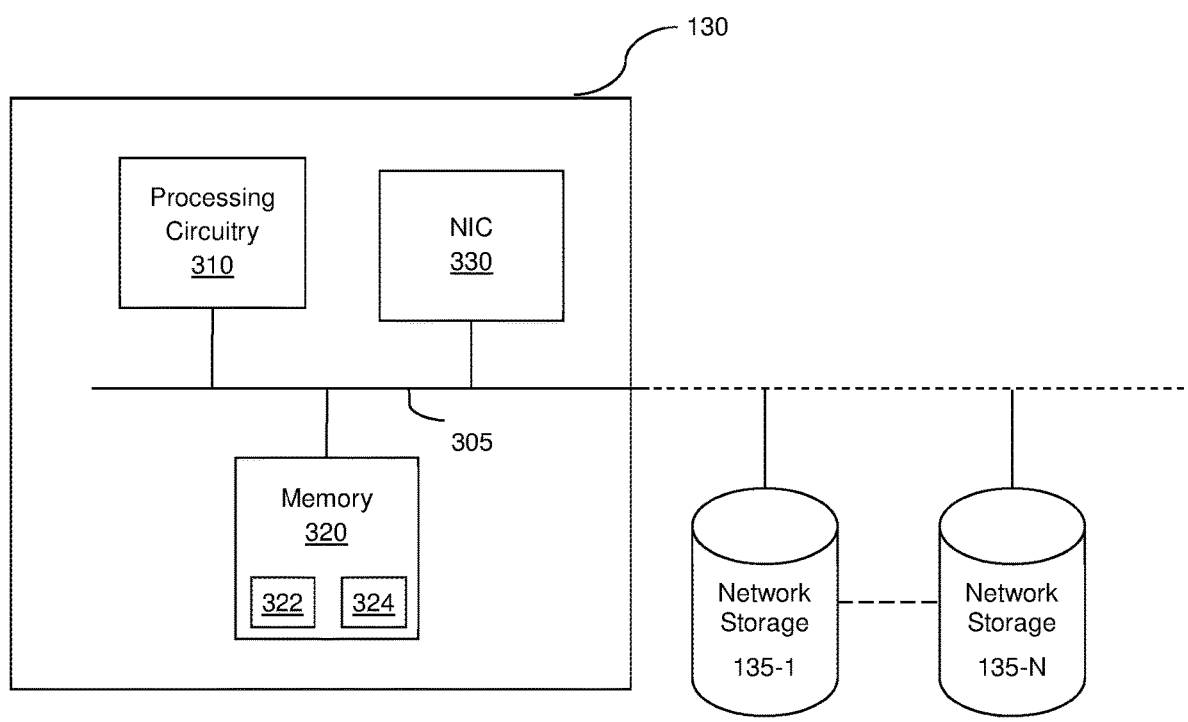
FIG. 3 is a schematic illustration of a storage server implemented according to an embodiment.

FIG. 3 is an example schematic illustration of a storage server 130 implemented according to an embodiment. The storage server 130 includes a processing circuitry 310, for example, a central processing unit (CPU). The processing circuitry 310 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The processing circuitry 310 is coupled via a bus 305 to a memory 320. The memory 320 may include a memory portion 322 that contains instructions that, when executed by the processing circuitry 310, performs the method described in more detail herein. In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 310 to perform the various processes described herein. The memory 320 may further include memory portion 324 containing a table of addresses which correspond to trimmed blocks.

The processing circuitry 310 may be coupled to network interface controller (NIC) 330. The NIC 330 is operative for providing various connectivity to the storage server, for example initiating one or more interfaces to allow communication between the storage server 130 and components of a network (such as the network 120 of FIG. 1), or other devices connected to the network (such as client device 110 of FIG. 1).

The processing circuitry 310 may be further coupled with one or more physical storage devices, such as storages 135-1 through 135-N. In an embodiment, the physical storage devices are stored locally with respect to the storage server 130. In a further embodiment, the physical storage devices are accessed remotely, e.g., over a network connection.

A storage device 135 may be used for the purpose of holding a copy of the method executed in accordance with the disclosed technique. Each physical storage device 135 may include therein, one or more logical storage volumes. In an embodiment, each storage device 135 may be a part of a logical storage volume which includes a storage device 135 and at least a portion of another storage device. Each logical storage volume is mirrored in a redundancy scheme such that a mirrored logical storage volume does not share any physical storage device with the corresponding logical storage volume.

Figure 4:
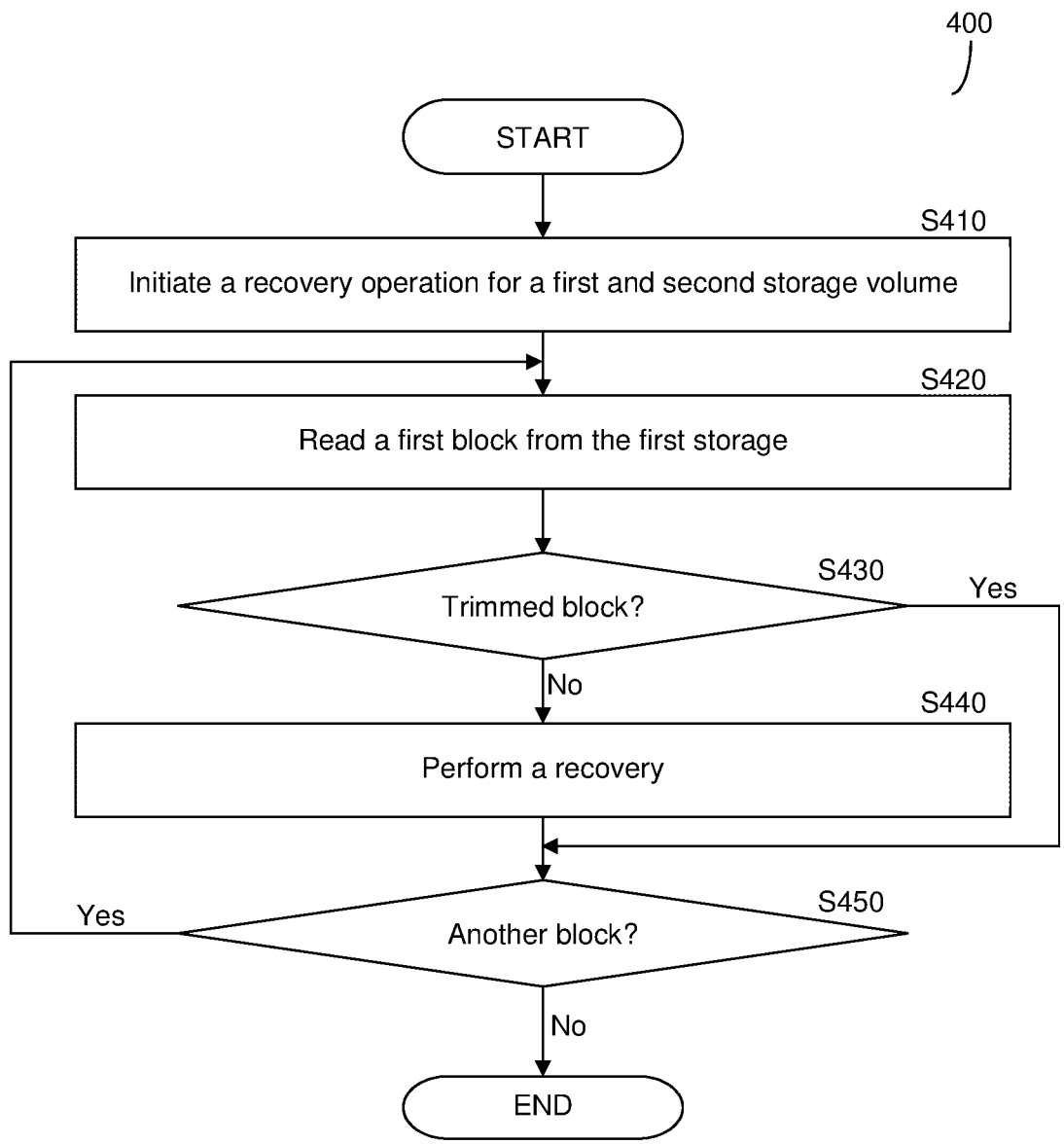
FIG. 4 is a flowchart describing a method for an improved recovery process of a mirrored storage volume, implemented in accordance with an embodiment.

FIG. 4 is an example flowchart 400 describing a method for an improved recovery process of a mirrored storage volume, implemented in accordance with an embodiment. In an embodiment, the method is performed by a server, e.g., the storage server 130 of FIG. 1.

At S410, a recovery operation is initiated for a first storage volume and at least a second storage volume, the storage volumes mirroring each other in a data redundancy scheme. The first storage volume may be a physical storage device, or a logical storage device containing one or more physical storage devices. The second storage volume may likewise be a physical storage device (different from the physical storage device of the first volume) or a logical storage device containing one or more physical storage devices (different from the physical storage devices of the first volume).

At S420, a first block is read from the first storage device. In some embodiments, the first block may include metadata, i.e., data describing the block, such as data indicating that the first block is (or is not) a trimmed block. In yet other embodiments, when sending a read instruction to the FTL of the storage device for a particular block, the storage device may perform a check, determine that the particular block is trimmed, and return a notification that the block is trimmed. In some embodiments, blocks may be read alternately from each storage. There are multiple techniques to determine that mirroring is consistent, and the disclosure is not limited to any particular one.

At S430, a check is performed to determine if the first block is a non-trimmed data block or a trimmed block. A non-trimmed data block is a block that contains therein data which was purposefully written and which a system is required to preserve. A trimmed block is marked for erasure (or being overwritten) and therefore the system has no use of any data which may be stored thereon. Comparing a trimmed block from one storage to a trimmed block from another storage is therefore a wasteful task resulting in increased operation time and higher utilization of network bandwidth. If the block is a data block, execution continues at S440. If the block is a trimmed block, execution continues at S450.

In some embodiments, in response to detecting that the first block is trimmed, an instruction to trim a corresponding block in another storage is initiated. For example, a slice may include two or more corresponding blocks, which should each contain mirrored data. When it is determined that one of the blocks of a slice is a trimmed block, then all blocks of the slice may be marked as trimmed. In some embodiments, in response to detecting that a first group of blocks is trimmed, an instruction to trim a group of corresponding blocks in other storages is initiated. For example, a slice may include three or more corresponding blocks, which should all have erasure coded data protecting them from an erased block or facilitating error correction. If it is determined that a subset of the blocks of a slice is a trimmed block, then all blocks of the slice may be marked as trimmed. Contents or metadata of blocks of a first storage may be compared to determine corresponding blocks of a second storage.

At S440, recovery is performed between the first block and at least another corresponding data block in the second storage volume. A recovery may be, for example, reading the contents of the first block, reading the contents of the corresponding data block, and performing a comparison to determine if they match. In some embodiments, it may suffice to read metadata corresponding to the data blocks. For example, it may be enough to read a hash function, or checksum, generated on the data block to reasonably determine that two data blocks are mirrored. If there is a match, i.e., the data of the block is fully mirrored, execution can continue for the next block, otherwise it is determined which data block should be mirrored. Determining which blocks match, e.g., based on a hash, allows the method to more efficiently determine which blocks require mirroring, as it is unnecessary to further compare and recover data between fully matching data blocks.

In an embodiment, timestamps of when data was written to each of the blocks are compared to each other, and then mirror the data which was written more recently. In an embodiment, the recovery is performed when it is determined that at least one of the storage devices are recovering from a failure.

At S450, a check is performed to determine if another block should be read. If 'yes' execution continues at S420, otherwise execution ends.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for comparing mirrored storage devices, comprising:
    selecting, from a storage slice of a first storage device and at least a second storage device, corresponding storage blocks that are not trimmed blocks, wherein trimmed blocks are blocks within a storage device marked for erasure;
    comparing the corresponding storage blocks such that a non-trimmed block of the first storage device is compared to a corresponding non-trimmed block of the second storage device to determine which storage blocks do not match; and
    performing a recovery operation between the non-trimmed block of the first storage device and a non-matching corresponding first non-trimmed block of the second storage device.

2. The method of claim 1, further comprising:
    marking all blocks of the slice as trimmed blocks when it is determined that the slice contains any blocks that are trimmed.

3. The method of claim 1, further comprising:
    trimming a block in the at least a second storage device when a corresponding block of a first storage device is determined to be trimmed.

4. The method of claim 1, wherein the determination if a block is trimmed is based on metadata describing the contents of the block.

5. The method of claim 1, wherein comparing the non-trimmed blocks of the first storage to the non-trimmed blocks of the second storage comprises comparing metadata of the first block and metadata of the second block.

6. The method of claim 5, wherein the metadata is a hash value of the contents of the non-trimmed block.

7. The method of claim 5, wherein the metadata a timestamp value indicating when the contents of the non-trimmed block were written, and wherein it is determined that the more recent of the blocks is a mirrored block.

8. The method of claim 1, the recovery operation is performed in response to detecting one or more of the storage devices are recovering from a failure.

9. The method of claim 1, wherein the number of blocks determined to be trimmed blocks is configurable.

10. A non-transitory computer readable medium having stored thereon instructions for causing a processing circuitry to perform a process, the process comprising:
    selecting, from a storage slice of a first storage device and at least a second storage device, corresponding storage blocks that are not trimmed blocks, wherein trimmed blocks are blocks within a storage device marked for erasure;
    comparing the corresponding storage blocks such that a non-trimmed block of the first storage device is compared to a corresponding non-trimmed block of the second storage device to determine which storage blocks do not match; and
    performing a recovery operation between the non-trimmed block of the first storage device and a non-matching corresponding first non-trimmed block of the second storage device.

11. A system for comparing mirrored storage devices, comprising:
    a processing circuitry; and
    a memory, the memory containing instructions that, when executed by the processing circuitry, configure the system to:
    select, from a storage slice of a first storage device and at least a second storage device, corresponding storage blocks that are not trimmed blocks, wherein trimmed blocks are blocks within a storage device marked for erasure;
    compare the corresponding storage blocks such that a non-trimmed block of the first storage device is compared to a corresponding non-trimmed block of the second storage device to determine which storage blocks do not match; and
    perform a recovery operation between the non-trimmed block of the first storage device and a non-matching corresponding first non-trimmed block of the second storage device.

12. The system of claim 11, wherein the system is further configured to:
    mark all blocks of the slice as trimmed blocks when it is determined that the slice contains any blocks that are trimmed.

13. The system of claim 11, wherein the system is further configured to:
    trim a block in the at least a second storage device when a corresponding block of a first storage device is determined to be trimmed.

14. The system of claim 11, wherein the determination if a block is trimmed is based on metadata describing the contents of the block.

15. The system of claim 11, wherein comparing the non-trimmed blocks of the first storage to the non-trimmed blocks of the second storage comprises comparing metadata of the first block and metadata of the second block.

16. The system of claim 15, wherein the metadata a hash value of the contents of the non-trimmed block.

17. The system of claim 15, wherein the metadata a timestamp value indicating when the contents of the non-trimmed block were written, and wherein it is determined that the more recent of the blocks is a mirrored block.

18. The system of claim 11, the recovery operation is performed in response to detecting one or more of the storage devices are recovering from a failure.

19. The system of claim 11, wherein the number of blocks determined to be trimmed blocks is configurable.

* * * * *